March 4, 1930.  J. ZUBATY  1,749,365
SERVICE INDICATOR
Filed June 13, 1927
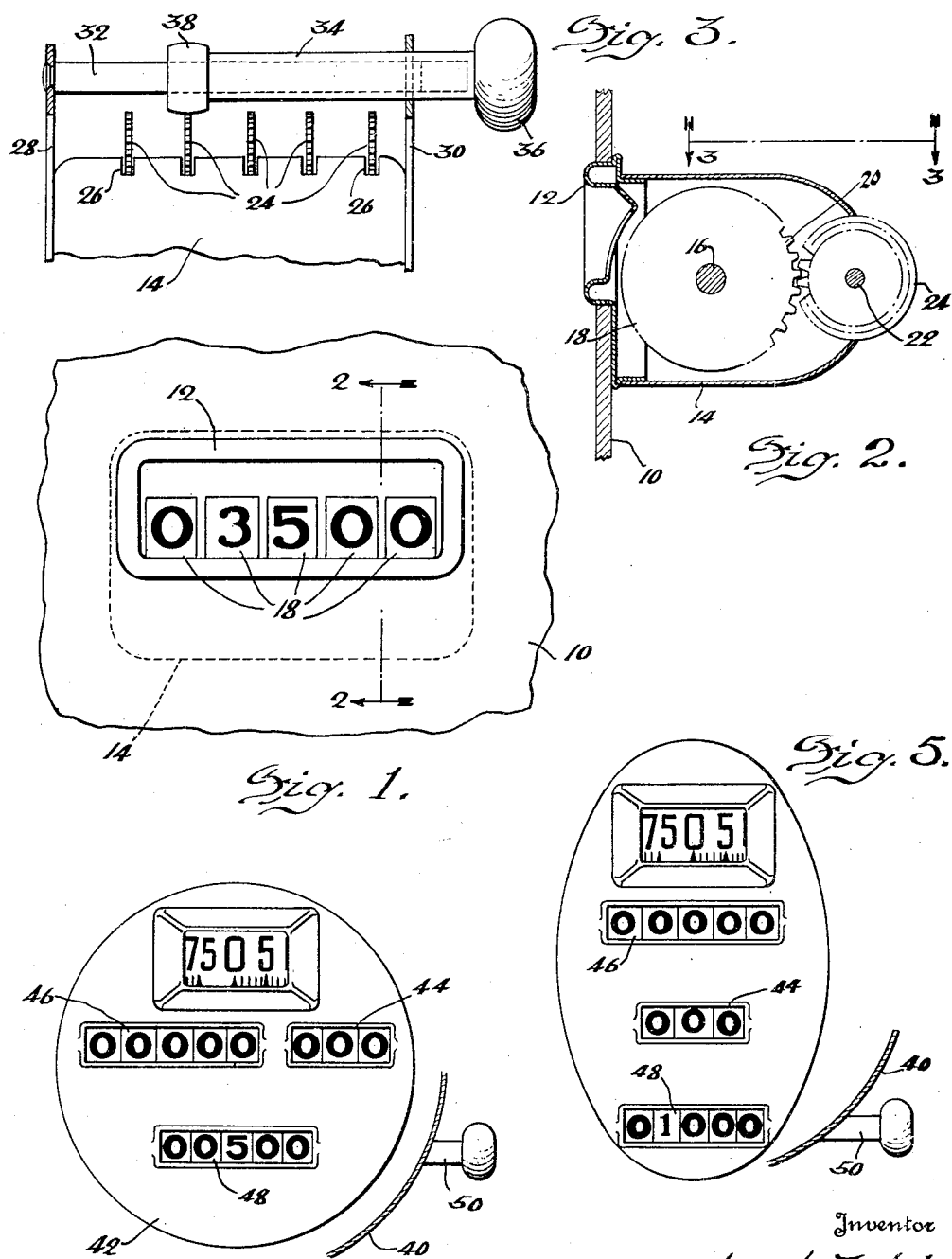

Patented Mar. 4, 1930

1,749,365

UNITED STATES PATENT OFFICE

JOSEPH ZUBATY, OF FLINT, MICHIGAN, ASSIGNOR TO A C SPARK PLUG COMPANY, OF FLINT, MICHIGAN, A COMPANY OF MICHIGAN

SERVICE INDICATOR

Application filed June 13, 1927. Serial No. 198,519.

My invention relates to a service indicating device of the type commonly used in connection with the speedometer of a motor vehicle to indicate when certain lubricating or other service operations should be performed.

It has for its principal object the provision of such a device in which there are a plurality of indicating members or figure wheels which may be engaged by a special reset stem and individually moved to show a desired number. They are not driven from the speedometer mechanism and are not connected with each other.

These indicating members or figure wheels may be mounted inside the speedometer casing or may be mounted separately upon the instrument board in a position where they may be readily compared with the odometer mechanism.

The purpose of these indicating members or figure wheels is to furnish a neat, easily adjustable record of the number of miles at which any of the various parts of the vehicle should be lubricated or otherwise taken care of.

With the above and other objects in view, my invention will be more clearly understood by referring to the specification and accompanying drawing, in which:

Fig. 1 is a view showing my improved service indicating device as mounted in an instrument panel;

Fig. 2 is a section taken on the line 2—2 of Fig. 1;

Fig. 3 is a view taken on the line 3—3 of Fig. 2;

Fig. 4 is a view showing the device associated with a speedometer; and

Fig. 5 is a view corresponding to Fig. 4 but showing a slightly different arrangement of the parts.

Referring to Fig. 1, the numeral 10 indicates an instrument panel of a motor vehicle. This panel is provided with an elongated opening in which is held, in any suitable manner, a bezel 12. Supported by this bezel is a housing 14 in which is carried a shaft 16 having journaled upon it a plurality of figure wheels 18. These figure wheels are similar to those commonly used in the odometer mechanism of speedometers and are provided with gear teeth 20 at one side. A second shaft 22 is also supported in the housing 14 and journaled upon this shaft are gear members 24 meshing with the teeth 20. These gear members project out through slots 26 in the housing 14.

Secured to the housing are supports 28 and 30. Riveted or otherwise secured in the support 28 is a third shaft 32 upon which is carried a rotatable axially movable sleeve 34 which is free to slide in and out through the support 30. At the outer end of this sleeve is a knurled member 36 and at the inner end a rubber or other resilient portion 38 so proportioned that it will bear against any one of the gear members to cause it to rotate when the sleeve is turned. It will be seen that in order to turn any of the figure wheels to a desired position, it is only necessary to slide the sleeve along until the resilient portion 38 engages the proper member 24, and then by turning the sleeve, the figure wheel will be rotated.

This device is intended to be located near the speedometer and the operation would be as follows: Let us assume that the driver wished to keep a record of the number of miles at which the crankcase oil should next be changed, he would turn the figure wheels so that they would register the proper number and by occasionally comparing this number with the number of miles registered on the speedometer, he would be reminded at the proper time that the oil should be changed. Obviously, this device may be used for keeping track of the service operations of various parts of the vehicle.

Because of the fact that the device is intended to be used in connection with a speedometer, it may be considered desirable to build it in as a part of the latter. In Fig. 4 the numeral 40 designates a speedometer casing within which is held the usual face plate 42, trip mileage figure wheels 44 and season mileage figure wheels 46. The service indicating figure wheels 48 may be installed below the odometer mechanism and controlled by the sleeve 50 which projects out through the casing 40. It will be understood, of course, that these service indicating figure wheels are not driven from or controlled with the odometer mechanism. Fig. 5 shows a somewhat different arrangement of the parts in another style speedometer.

It is thought from the foregoing taken in connection with the accompanying drawing that the construction and operation of the device will be apparent to those skilled in the art, and that various changes in size, shape, and proportion and details of construction may be made without departing from the spirit and scope of the appended claims.

I claim:

1. A service indicating device comprising, in combination, a plurality of indicating members, means in driving engagement with each of said members, and an axially movable member including a resilient portion, said portion being adapted to frictionally engage said means for the purpose of resetting its respective member to a desired position.

2. A service indicating device comprising, in combination, a casing, a plurality of figure wheels mounted within the casing, a member in driving engagement with each wheel, a shaft, and an axially movable sleeve supported on said shaft and adapted to engage any one of said members for the purpose of resetting its respective wheel to a desired position, said sleeve extending outside said casing.

3. A service indicating device comprising, in combination, a plurality of figure wheels, a gear in driving engagement with each of said wheels, a shaft, an axially movable sleeve supported on said shaft, and a resilient member on said sleeve, said resilient member being adapted to engage any one of said gears for the purpose of resetting its respective figure wheel to a desired position.

In testimony whereof I affix my signature.

JOSEPH ZUBATY.